United States Patent
Eggleston, Jr.

[15] 3,653,050
[45] Mar. 28, 1972

[54] PIPE LOCATOR METHOD AND APPARATUS

[72] Inventor: Herbert L. Eggleston, Jr., Glendale, Calif.

[73] Assignee: The Goldak Company, Inc., Glendale, Calif.

[22] Filed: Dec. 29, 1969

[21] Appl. No.: 888,445

[52] U.S. Cl. .............................343/112 D, 61/72.1, 324/3, 324/67, 325/361, 343/873
[51] Int. Cl. .................................................G01s 11/00
[58] Field of Search .................61/72.1; 324/3, 67; 325/28, 325/112, 361; 340/18 DC; 343/112 A, 112 D, 113 PT, 101, 107, 788, 888, 873

[56] References Cited

UNITED STATES PATENTS

| | | | |
|---|---|---|---|
| 3,078,348 | 2/1963 | McIntosh | 343/888 X |
| 2,535,053 | 12/1950 | Ercolino | 343/113 PT X |
| 3,234,455 | 2/1966 | Idel | 324/3 X |
| 3,418,572 | 12/1968 | Humphreys, Jr. | 324/67 |
| 3,281,660 | 10/1966 | Studenick | 324/3 |

OTHER PUBLICATIONS

C. A. Young, " Measuring The Depth of Buried Cable," Bell Laboratories Record, Nov. 1965, pp. 399–401.

Primary Examiner—Rodney D. Bennett, Jr.
Assistant Examiner—Richard E. Berger
Attorney—Beehler & Arant

[57] ABSTRACT

A method is disclosed of measuring the depth of an underground pipe by drilling a vertical hole which extends below and beside the pipe, transmitting electromagnetic energy into the pipe, coupling a small antenna to a receiver which is tuned to the frequency at which the pipe is energized, dropping the antenna down into the hole, and observing the maximum signal indicated by the receiver as the center of the antenna reaches the depth of the pipe.

Also disclosed is a receiver having a flexible cable connected to its input, the other end of the flexible cable being connected to the upper end of a handle member, the handle member having a small antenna attached to its lower end as an extension thereof, and including conductor means carried by the handle member which electrically connects the antenna to the flexible cable. More specifically, the antenna is disclosed as a small ferrite rod antenna, and the handle member as a metallic tube having an insulated coaxial conductor carried within its interior, the upper end of the handle member being threaded for the threaded attachment of a superimposed handle member extension and also having a jack for connection of the flexible cable.

10 Claims, 9 Drawing Figures

INVENTOR.
HERBERT L. EGGLESTON, JR.
BY Beehler & Arant
ATTORNEYS

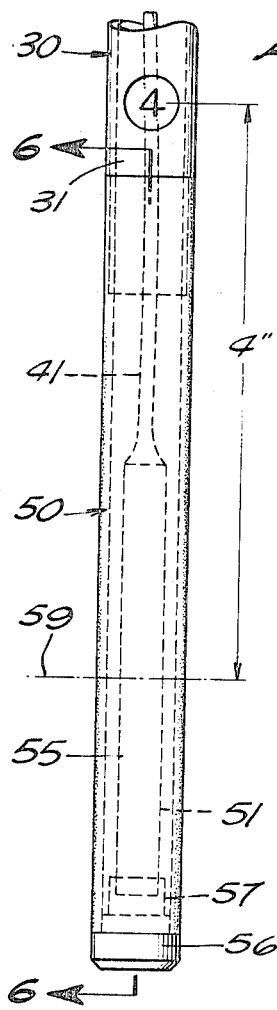
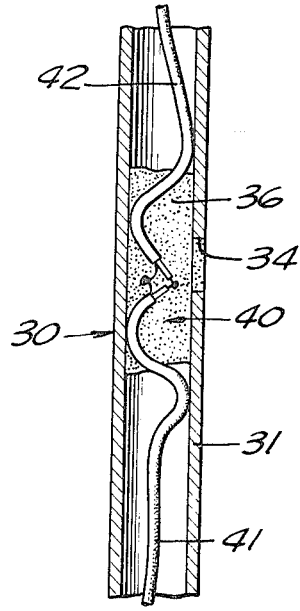
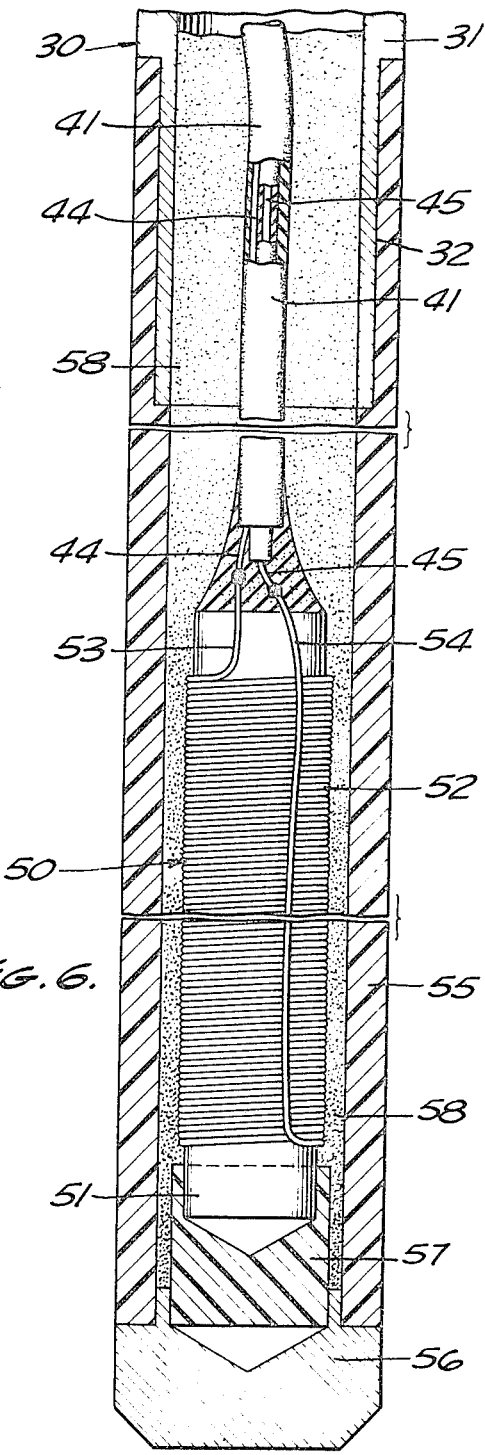
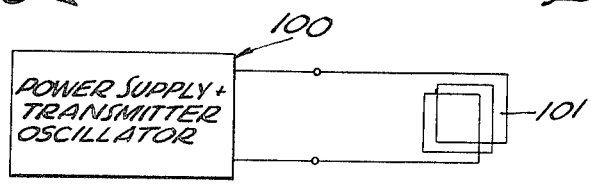
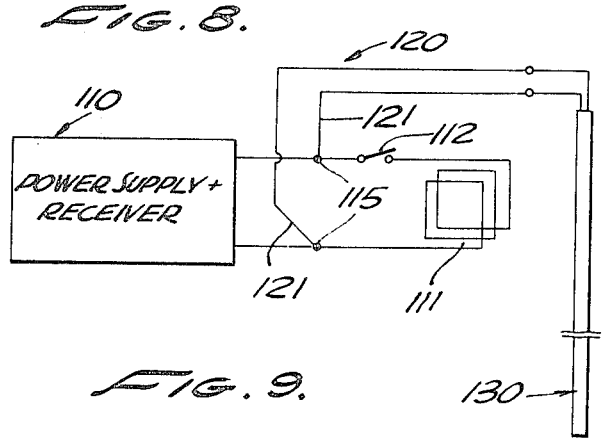

3,653,050

PIPE LOCATOR METHOD AND APPARATUS

The foregoing abstract is not intended as a description of the invention or to indicate the scope of the patent to be granted, but has been submitted in compliance with Patent Office requirements in order to provide a convenient searching tool for scientists, engineers, and other researchers.

BACKGROUND OF THE INVENTION

Electronic pipe locators are well known. A typical system includes a transmitter oscillator contained in one box, having its own antenna loop associated with it, and a receiver contained in another separate box also having an associated antenna loop. In operation, the transmitter is energized and the axis of its antenna loop is aligned parallel to the longitudinal axis of the underground pipe, so as to transmit a strong electromagnetic signal into the pipe. The receiver box is also aligned so that the plane of its antenna loop is aligned parallel with the longitudinal axis of the pipe. The receiver is then moved laterally until a maximum signal is produced, which indicates that the receiver is located precisely over the pipe. In this manner, the lateral location of the pipe is determined. Typical operating frequency is 108 kHz.

There are many situations where it is also necessary to make a precise measurement of the depth at which an underground pipe lies beneath the surface. A common procedure heretofore has been to use an electronic pipe locator for locating the lateral position of the pipe, and then dig a large hole at least 1 foot wide and 3 feet long in order to ascertain the precise depth of the pipe. That method of measuring the pipe depth has been cumbersome, time consuming, and expansive, and so have other alternative approaches to the problem.

According to the present invention the depth of a pipe is measured by drilling a small hole beside the pipe, laterally offset a sufficient distance to be sure that the pipe is missed when the hole is drilled. Then a small remote antenna device, coupled to the receiver by a flexible cable, is lowered into the hole beside the pipe. A handle member having distance scale markings on it is attached to the antenna device and is used for lowering the antenna device into the hole. When maximum signal indicates that the antenna device has reached the same depth as the pipe a depth reading is taken from the scale on the handle member.

DRAWING SUMMARY

FIG. 5 is an elevational view of the antenna device and lower end of the handle member;

FIG. 6 is an enlarged cross-sectional view taken on the line 6—6 of FIG. 5;

FIG. 7 is a longitudinal cross-sectional view of a portion of the handle member;

FIG. 8 is an electrical schematic diagram of the transmitter; and

FIG. 9 is an electrical schematic diagram of the receiver.

PREFERRED EMBODIMENT

Figure 1:
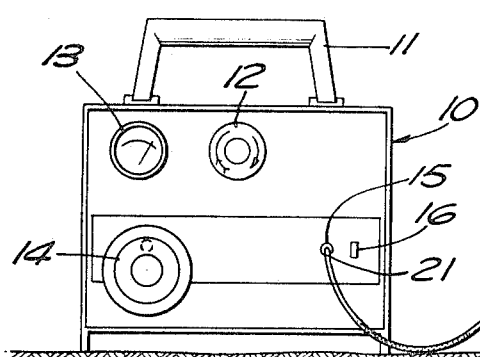
FIG. 1 is an elevational view, partially in cross section, showing the application of the presently preferred form of the invention in measuring the depth of an underground pipe.

Referring first to FIG. 8, the transmitter including its power supply and oscillator circuit is schematically illustrated at numeral 100. The associated loop antenna, carried with the portable transmitter in fixed relationship thereto, is identified as 101.

FIG. 9 schematically illustrates the receiver which with its power supply is identified as 110. The associated loop antenna, carried in the same portable housing, is identified as 111. A switch 112 is available for disconnecting the loop antenna 111. A remotely located handle member 130 is used for carrying an antenna device (not shown). A cable 120 extends from the upper end of the handle member to the receiver, the receiver having jack terminals 115 which receive the plug terminals 121 of cable 120. Connecting the cable 120 by means of its plug 121 also serves to open the switch 112 (by means not shown), so that only one antenna at a time is connected to the receiver.

In carrying out the invention the transmitter is located in a fixed position relative to the pipe P. Antenna 101 is aligned with the longitudinal axis of the pipe and may be located directly above it or laterally to either side of it. Alternatively, some other means of transmitting electromagnetic energy to the pipe may be used, since the measurement principle of the present invention is achieved in receiving signals reflected from the pipe, irrespective as to how the energy was injected into the pipe in the first instance.

Referring now to FIG. 1, the portable receiver unit 10 has a carrying handle 11 and a connection jack 15 for the flexible coaxial cable 20. Cable 20 has male plugs on both ends, the plug 21 being connected to the receiver jack 15 while the plug 22 is connected to the upper end of the antenna handle. Receiver 10 includes an indicator meter 13 for indicating the strength of the received signal. A loudspeaker 14 is also provided for indicating the signal strength audibly. A gain adjustment knob 12 is utilized for adjusting the receiver gain. The receiver 10 also includes a depth gauge 16. Depth gauge 16 is not used in conjunction with the present invention, but rather was used in an electronic triangulation method of measuring depth, over which the present invention is an improvement.

The antenna 50 is attached to the lower end of a handle member 30 as an extension thereof. A first handle extension 60 is attached on top of handle member 30 and a second handle extension 70 is attached on top of handle extension 60. However, in the particular illustration shown in FIG. 1 the depth of the pipe is only 60 inches, and the second handle extension 70 would not be required for measuring to that depth level.

Referring now to the FIGS. 5 and 6, the antenna 50 includes an elongated ferrite rod 51 on which an insulated conductor 52 is helically wound. Handle member 30 consists mainly of an aluminum tube 31, a conductor means 40 consisting of a lower section 41 of coaxial cable and an upper section 42 of coaxial cable which are contained and supported within the handle member. The lower coaxial cable section 41 has its outer conductor 44 connected to the near end 53 of the antenna winding, while its inner conductor 45 is connected to the remote end 54 of the antenna wire. While remote end 54 is shown as being returned in a direction parallel to the axis of the rod 51, it is in fact preferred to loop the wire two or three times about the rod as it is being returned to the upper end for connection to the cable. Outer conductor 44 is helically wound.

The antenna 50 is contained within an epoxy-glass tube 55, the lower end of tube 55 being closed by an aluminum end plug 56. An insulator plug 57 rests above, and concentrically within, the end plug 56, for receiving and positioning the lower end of ferrite rod 51. The antenna winding 52 is surrounded by potting compound 58 which maintains the concentric relationship of the antenna within the tube 55.

Figure 4:
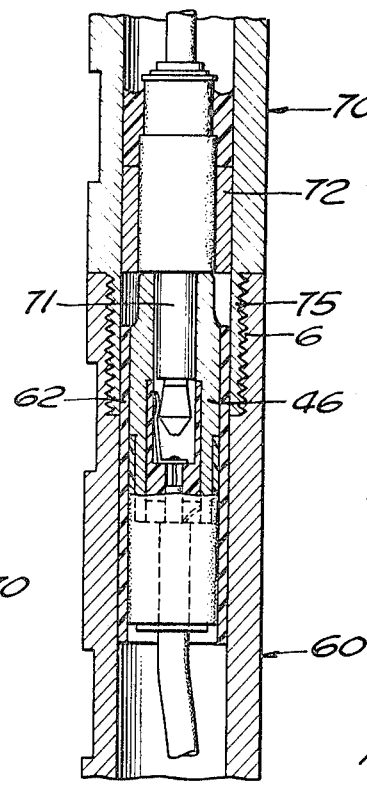
FIG. 4 is a vertical cross-sectional detail taken at the line 4—4 of FIG. 1.

The lower end of aluminum tube 31 is recessed at 32 on its outer surface in order to receive the upper end of tube 55 which is secured thereto by means of adhesive. The upper end of coaxial cable 41 is soldered to the lower end of coaxial cable 42 adjacent an access window 34 in the aluminum tube (see FIG. 7) and is surrounded by potting compound 36. The upper end of coaxial cable 42 terminates in a female jack 56 (FIG. 4). The construction of the jacks is entirely conventional and hence need not be described in detail here.

Figure 3:
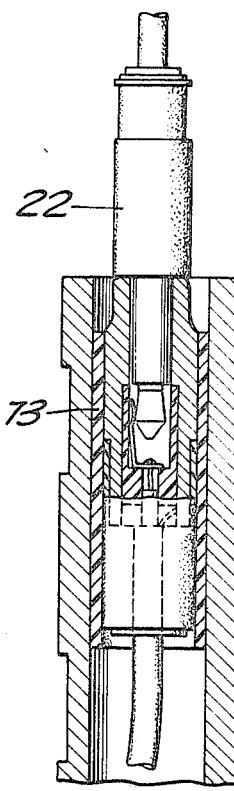
FIG. 3 is a vertical cross-sectional detail taken at the line 3—3 of FIG. 1.

While FIG. 4 actually illustrates the joint between handle extension 60 and handle extension 70, the construction of the joint between handle member 30 and handle extension 60 is identical. pipe lies As best seen from FIG. 3 in conjunction with FIG. 4, each handle extension is equipped with a female jack on its upper end and a male plug on its lower end. Thus the male plug 71 from extension 70 fits into the female jack 46 of extension 60, while the male plug 61 of extension 60 fits into the female jack 46 of handle member 30. Each extension contains a length of coaxial cable, insulated from the aluminum tube, interconnecting the plug and jack.

The extension 60 contains an insulating sleeve 62 which rigidly supports the female jack 46, and extension 70 has a similar insulating sleeve 73. Male plug 71 of extension 70 has an insulator base which is received in an aluminum sleeve 72, for centering the plug in the extension. The lower end of extension 70 has a male thread 75, and extension 60 on its upper end has a female thread 65, these threaded ends being mechanically secured together so as to support the two handle extensions in rigid relationship while the electrical circuits carried inside the handle extensions are also electrically connected together by the male plug and female jack. In a similar manner the lower end of handle extension 60 contains a male thread connection (not shown) and the upper end handle member 30 has a female thread (also not shown).

Typical dimensions of the remote antenna device are shown in FIG. 5. A horizontal line 59 indicates the longitudinal center of the ferrite rod 51 and also of the antenna winding 52. The length of the ferrite rod is about 3 inches, and the length of the tube 55 is about 4½ inches. The lower end of handle 30 carries a numeral 4 which indicates a distance of precisely 4 inches above the reference line 59. Other graduated scale markings are carried by the handle member 30, up to 32 inches. Additional scale markings on the same linear scale are carried by the handle extension 60 (see FIG. 2).

As the ferrite rod antenna is lowered into the hole its longitudinal axis is vertical, and hence perpendicular to the longitudinal axis of the pipe P. A maximum signal is obtained when the longitudinal center (reference line 59) is at the same elevation as the center of pipe P. This is the condition illustrated in FIG. 1. At that position of the antenna the receiver produces a maximum output signal.

Figure 2:
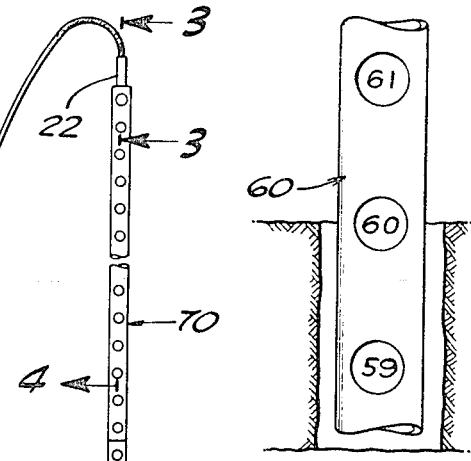
FIG. 2 is a detail taken within the circle 2—2 of FIG. 1.

When maximum output is obtained from the receiver a depth reading is taken from the scale on handle 30 or extension 60 or 70 (see FIG. 2). The depth reading is accurate to plus or minus 1 inch. For the purposes of construction work, regrading of road surfaces, and the like, this degree of accuracy is quite satisfactory. The invention has the advantages of simplicity, convenience, and modest cost.

The invention has been illustrated in its principal application for measuring the depth of a pipe below the surface of ground. However, it may also be used above ground, and the operator simply walks along holding the handle member 30 in a vertical position until a minimum or null output signal is obtained from the receiver. That minimum signal indicates that the pie lines directly beneath the ferrite rod antenna.

What is claimed is:

1. The method of measuring the depth of an underground pipe comprising the steps of:

drilling a generally vertical hole so that it extends beside and on below the pipe;

transmitting electromagnetic energy to the pipe at a predetermined frequency;

coupling a small ferrite rod antenna to a receiver which is tuned to said predetermined frequency;

lowering the ferrite rod antenna into the hole while maintaining its longitudinal axis essentially vertical and hence perpendicular to the longitudinal axis of the pipe;

observing the maximum signal indicated by the receiver as the longitudinal center of the antenna reaches the same depth as the pipe;

and measuring the distance from the center of the antenna to the surface of the ground.

2. Pipe locator apparatus comprising:

a receiver adapted to receive signals at a predetermined frequency, said receiver including a built-in loop antenna and a switch for disconnecting said loop antenna;

a ferrite rod antenna including an elongated ferrite rod and an insulated conductor wound helically thereon;

an elongated handle member supportingly attached to said antenna in longitudinal alignment with said ferrite rod, said antenna extending from the lower end of said handle member;

conductor means attached to said antenna and extending the length of and supported by said handle member;

and flexible cable means connected to said conductor means at the upper end of said handle member;

said receiver also including means for removably attaching said flexible cable means in place of said loop antenna, whereby the other end of said cable means may be connected to said receiver for supplying thereto signals acquired by said antenna.

3. Pipe locator apparatus comprising:

a receiver adapted to receive signals at a predetermined frequency;

a ferrite rod antenna including an elongated ferrite rod and an insulated conductor wound helically thereon;

an elongated handle member supportingly attached to said antenna in longitudinal alignment with said ferrite rod, said antenna extending from the lower end of said handle member;

conductor means attached to said antenna and extending the length of and supported by said handle member;

and flexible cable means connected to said conductor means at the upper end of said handle member and having its other end connected to said receiver for supplying thereto signals acquired by said antenna;

said handle member including a metallic tube, said conductor means being disposed inside said tube and terminating in a connector fixedly supported in the upper end of said tube, and said flexible cable means being provided with a mating connector for removable attachment to said handle member.

4. Apparatus as claimed in claim 3 wherein said metallic tube is threaded at its upper end, and which further includes a handle extension formed from a metal tube and having its lower end threaded for mechanical connection to said handle member, said handle extension including additional conductor means disposed therein for electrical connection between said flexible cable means and said ferrite rod antenna.

5. The method claimed in claim 1 which includes the additional steps of attaching the ferrite rod antenna to the lower end of an elongated measuring stick, and manipulating the measuring stick from its upper end in order to lower the antenna into the hole.

6. Pipe locator apparatus comprising:

a receiver adapted to receive signals at a predetermined frequency;

a ferrite rod antenna including an elongated ferrite rod and an insulated conductor wound helically thereon;

an elongated handle member supportingly attached to said antenna in longitudinal alignment with said ferrite rod, said antenna extending from the lower end of said handle member;

conductor means attached to said antenna and extending the length of and supported by said handle member;

flexible cable means connected to said conductor means at the upper end of said handle member and having its other end connected to said receiver for supplying thereto signals acquired by said antenna;

and which further includes an epoxy-glass tube attached to the lower end of said handle member as an extension thereof, said ferrite rod and conductor being concentrically disposed within said tube and encapsulated in insulating material, and an end plug attached beneath said tube.

7. Pipe locator apparatus comprising:

a receiver adapted to receive signals at a predetermined frequency;

a ferrite rod antenna including an elongated ferrite rod and an insulated conductor wound helically thereon;

an elongated hollow, metallic handle member;

electrical insulating means attaching said antenna to the lower end of said handle member such that said ferrite rod is in longitudinal alignment with said handle member;

conductor means attached to said antenna and extending upward within said handle member throughout the length thereof;

and flexible cable means connected to said conductor means at the upper end of said handle member and having its other end connected to said receiver for supplying thereto signals acquired by said antenna;

said handle member having graduated scale markings on its exterior surface indicating the distance above the longitudinal center of said ferrite rod;

whereby said handle member may be used for inserting said ferrite rod antenna down into a hole, for removing it from the hole, and also for measuring the depth of the longitudinal center of said ferrite rod below the surface of the ground.

8. Apparatus as claimed in claim 7 which further includes an electrically insulative housing within which said ferrite rod antenna is contained, said housing being of elongated cylindrical configuration and having the same external diameter as said handle member.

9. Apparatus as claimed in claim 8 which further includes a metallic end plug attached to the lower end of said housing.

10. Apparatus as claimed in claim 9 wherein said metallic end plug includes means for aligning the longitudinal axis of said ferrite rod concentric to the longitudinal axis of said handle member.

* * * * *